United States Patent [19]

Perry

[11] Patent Number: 5,029,487
[45] Date of Patent: Jul. 9, 1991

[54] CONTINUOUSLY-VARIABLE-RATIO TRANSMISSIONS OF THE TOROIDAL RACE ROLLING TRACTION TYPE

[76] Inventor: Forbes G. D. Perry, Long Meadow, Church Street, Charlbury, Oxford, OX7 3PP, Great Britain

[21] Appl. No.: 457,690
[22] PCT Filed: Apr. 7, 1988
[86] PCT No.: PCT/GB88/00535
 § 371 Date: Dec. 29, 1989
 § 102(e) Date: Dec. 29, 1989
[87] PCT Pub. No.: WO89/00256
 PCT Pub. Date: Jan. 12, 1989

[30] Foreign Application Priority Data
 Jul. 7, 1987 [GB] United Kingdom ............... 8715952

[51] Int. Cl.$^5$ .............................. F16H 15/08
[52] U.S. Cl. ........................ 74/199; 74/200
[58] Field of Search .................... 74/199, 200, 213

[56] References Cited
U.S. PATENT DOCUMENTS
 3,181,381 5/1965 Jorgensen ............... 74/199

FOREIGN PATENT DOCUMENTS

| 449674 | 9/1927 | Fed. Rep. of Germany . |
| 1210193 | 3/1960 | France . |
| 220331 | 5/1925 | United Kingdom . |
| 410150 | 5/1934 | United Kingdom . |
| 438259 | 11/1935 | United Kingdom . |
| 482493 | 3/1938 | United Kingdom . |
| 1147248 | 4/1969 | United Kingdom . |
| 1232367 | 5/1971 | United Kingdom . |
| 1296827 | 11/1972 | United Kingdom . |
| 2023753 | 6/1979 | United Kingdom . |
| 2100372 | 6/1979 | United Kingdom . |

Primary Examiner—Allan D. Herrmann
Assistant Examiner—David W. Laub
Attorney, Agent, or Firm—Walter C. Farley

[57] ABSTRACT

A continuously variable transmission which has an input disc (40) and an output (45) defining a toroidal race (41, 46) and rollers (48) between the discs (40, 45), the rollers (48) being adjustable in unison to vary the transmission ratio by means of an internal operating member (51), and an external operating lever (59) which has a cam (56) determining the position of and having a non-linear relationship with a follower (55, 50) which is connected to the internal member (51).

8 Claims, 2 Drawing Sheets

CONTINUOUSLY-VARIABLE-RATIO TRANSMISSIONS OF THE TOROIDAL RACE ROLLING TRACTION TYPE

BACKGROUND TO THE INVENTION

This invention relates to continuously-variable-ratio transmissions of the toroidal race rolling traction type. It relates especially to control of the variator, that is to say the ratio-varying unit, of such a transmission. Such units have been described in detail in various published patent specifications, such as GB-1296827, which will be described in more detail later. From this and other specifications it is known to provide a ratio-varying unit comprising an input disc and an output disc and rollers to transmit drive between them and a control member disposed within the unit (e.g. within the casing thereof) operable to vary the attitude of the rollers in unison and so vary the transmitted ratio.

In sophisticated transmissions using variators of the toroidal race type, it is known for the said member to be controlled by a lever which is precisely located at all times by a mechanism capable of working within close limits of accuracy. Examples of hydraulic mechanisms for this purpose are described in detail in GB-2023753-B and GB-2100372-B. The present invention, however, relates primarily to less sophisticated and expensive transmissions, and for the need to provide for the control member an operating mechanism that is simple and versatile and is operationally more effective than for the operator simply to hold the end of a lever.

SUMMARY OF THE INVENTION

According to one aspect the invention is characterised in that between a lever which is disposed outside the unit (e.g. outside the toroidal race assembly and normally outside a casing thereof) and the internal control member which is operable to vary the attitudes of the rollers in unison, there is a cam and follower, the cam positively determining the position of the follower.

Preferably the interaction of the cam and the follower is such that the relationship between angular movement of the cam and the resulting movement of the follower is non-linear.

The invention is particularly useful in a transmission which has a geared idle state; and the cam and follower may be arranged so that for a constant speed of rotation of the input disc, movement of the follower from one extreme of its movement to the other effects a change of motion of a final output member of the transmission from maximum speed of rotation in one sense to maximum in the opposite sense, through the geared idle state. The engagement of the cam and follower when the transmission is in the geared idle condition and no input force is being exerted upon the operating member of the mechanism, may be such that any tendency of the final output member to depart from a zero torque condition gives rise to a reaction between the follower and the cam which tends to move the follower so as to restore that zero torque condition.

In one form of the invention part of the cam may be of constant radius relative to the axis of rotation of the cam, and the follower may be in register with this part of the cam at geared idle.

Alternatively the said lever or the adjusting mechanism may be biased to the position corresponding to the geared idle state of the transmission.

The cam may be arcuate slot and the follower may be a pin or roller moveable in the slot.

DETAILED DESCRIPTION

Figure 1:
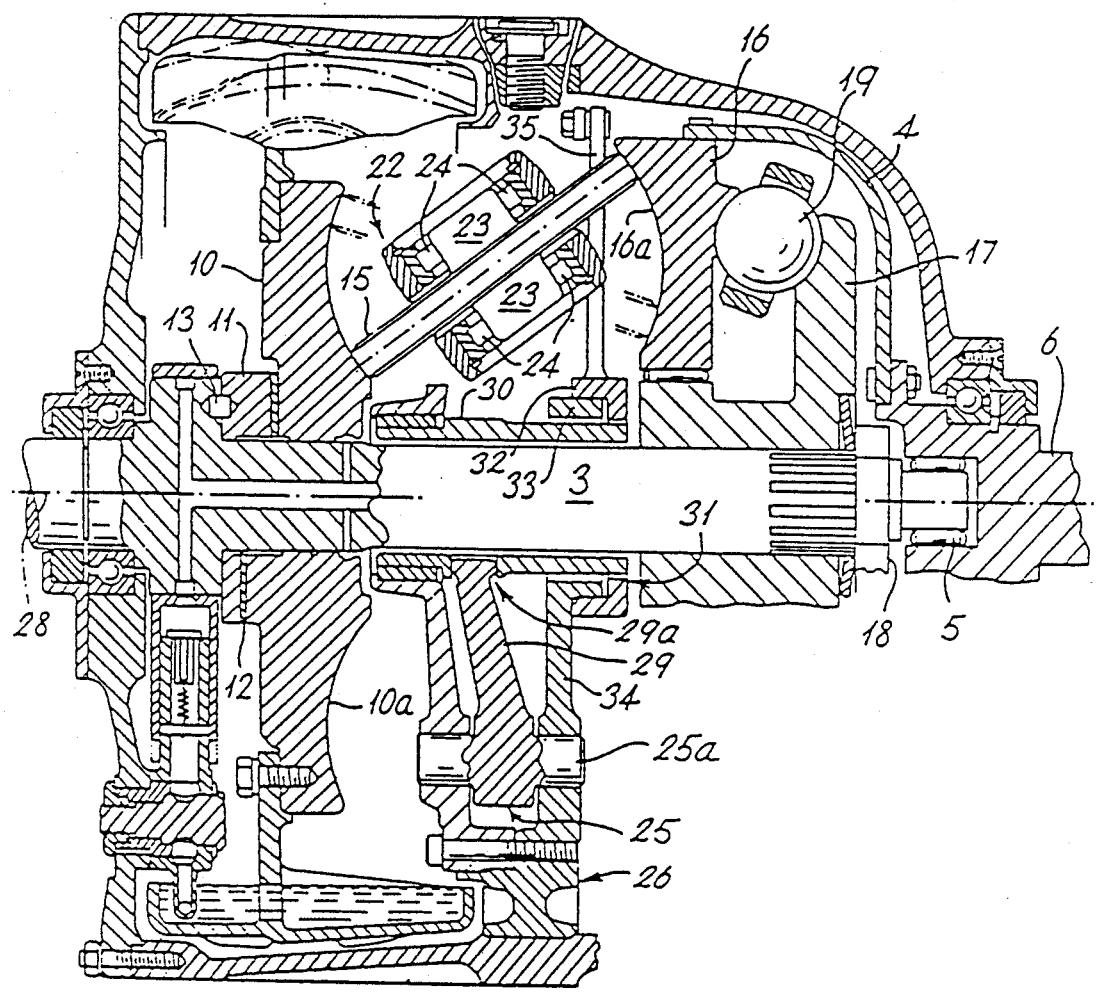
FIG. 1 illustrates a known mechanism by way of example.

FIG. 1, which corresponds to FIG. 1 of GB-1296827, shows a variator of the toroidal race rolling traction type comprising an input disc 10, formed with a part-toroidal race 10a carried on an input shaft 3, and an output disc 16 formed with a corresponding part-toroidal race 16a and coupled to an output shaft 6 by a bell-shaped member 4. Drive is transmitted between races 10a and 16a by three rollers 15, of which only one is shown. Each roller 15 is mounted in a roller carrier 22 which defines a rolling axis for that roller through the engagement of a spigot 23 carried on the roller and a bearing 24 mounted on the carrier. The three rollers and their carriers are located at equal angular spacings around the axis 28 of the discs 10 and 16, which is also the common axis of shafts 3 and 6.

Although it is not relevant to the present invention, it is well understood in the art that means must be provided to generate a force urging the input and output discs axially together, so as to set up the necessary force of reaction between rollers 15 and races 10a and 16a to enable the rollers to transmit drive from one race to the other substantially without slip. In FIG. 1 this is achieved by providing disc 10 with limited freedom to rotate on shaft 3 under restraint by a loading device comprising a ring 11. The right-hand face of that ring is of cam shape and co-operates, through a washer 12 of low friction material, with a complementary cam shape formed on the left-hand face of disc 10. Ring 11 is anchored to rotate with shaft 3 by means of a dowel pin 13 which enters aligned holes in the ring 11 and an adjacent boss 14 which is integral with shaft 3. Relative rotation between disc 10 and ring 11 forces disc 10 to the right to load it against the rollers 15.

A thrust plate 17 is secured to the end of shaft 3 by a nut 18 close to a bearing 5 by which the output shaft 6 is supported on the input shaft 3. Plate 17 forms one race of a ball bearing 19, the other race of which is formed on the right-hand face of output disc 16.

When input shaft 3 is rotated, drive is transmitted to input disc 10 by way of ring 11, which turns to an extent dependent upon the torque transmitted and in so doing exerts a force proportional to this torque in an axial direction. This tends to force disc 10 to the right and to force disc 16, by way of bearing 19, plate 17, shaft 3, boss 14, ring 11 and washer 12, to the left, so creating the necessary drive-transmitting reaction between rollers 15 and races 10a and 16a.

The mechanism by which the orientation of carriers 22 and rollers 15 may be changed so as to vary the transmitted ratio comprises a pivotal connection (not shown) between each carrier 22 and the outer end of a rocker lever 25, pivotally mounted at 25a in a spider assembly 26 which is anchored to the main casing of the transmission. Each lever 25 includes an inwardly-extending limb 29, the tip of which is received in a slot 29a in a sleeve 30 which is capable of limited radial movement relative to axis 28 under the influence of the torque reaction forces applied to it from the rollers 15 by way of the rocker levers 25. When those forces are unequal, the sleeve 30 can move radially in this way so as to tend to restore equality.

To change the ratio of the transmission unit as a whole, sleeve 30 is rotated to displace the roller carriers 22 in unison. An operator does this by moving a lever 35. This lever is attached to a collar 32 which is pivotally carried on a ring 33 supported on inwardly-extending limbs 34 of spider assembly 26. When collar 32 is rotated by means of the lever 35, it engages with dogs 31 formed on the right-hand end of sleeve 30, and so rotates the sleeve and changes the orientation of the rollers 15 by reason of the engagement of their carriers 22 with the limbs 29 which move with the rotation of the sleeve. The dogs 31 are crowned or otherwise shaped so as to provide a universal coupling between themselves and collar 32.

Figure 2:
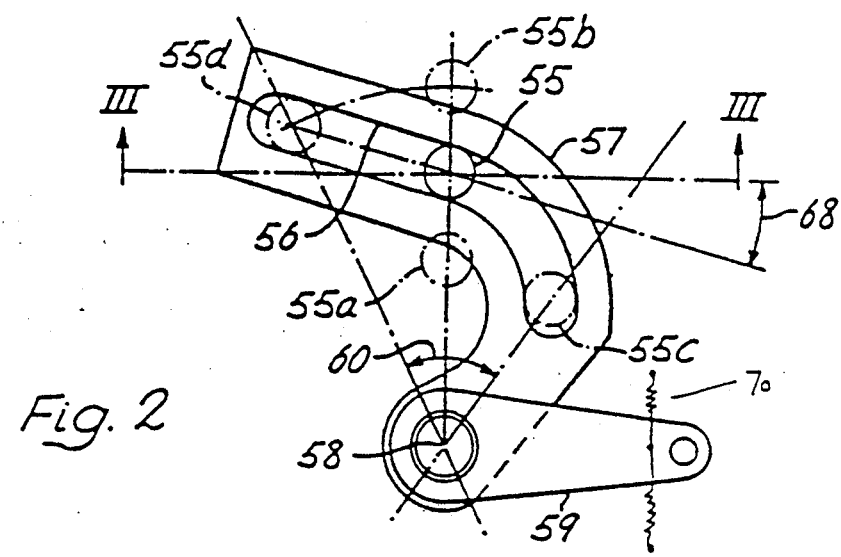
FIG. 2 is view of a part of a transmission in accordance with the invention.
Figure 3:
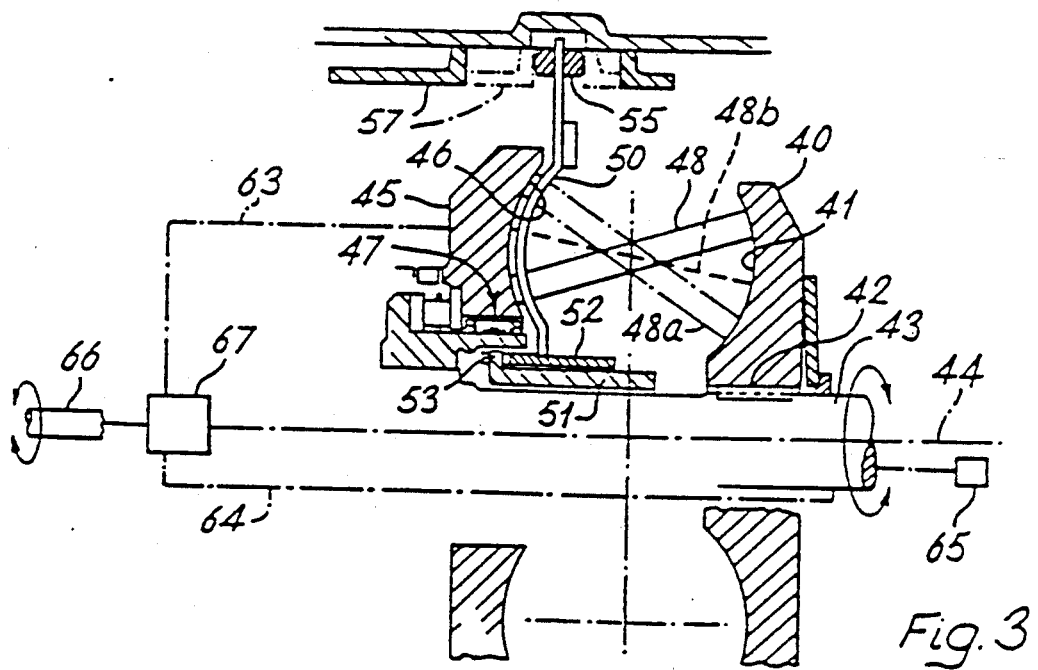
FIG. 3 shows further details of the transmission in a section taken on the line III—III in FIG. 2.

FIG. 3 shows a variator in which an input disc 40 formed with a part-toroidal race 41 is keyed at 42 to the input shaft 43 of the transmission, which rotates about an axis 44. An output disc 45, formed with a corresponding part-toroidal race 46, is free to rotate about axis 44 because it is carried by one half of a roller bearing assembly 47, the other half of which is mounted on structure fixed to shaft 43. Three rollers 48, of which only one is shown, are similar in both operation and essential construction to the rollers 15 of FIG. 1. Parts equivalent to items 22, 25, 34 and 26 of FIG. 1 are not shown but will nevertheless be present in the transmission of FIGS. 2 and 3. The arm 50 corresponds to the lever 35, a sleeve 51 which is rotatable about shaft 43 corresponds to sleeve 30, and the engagement between a sleeve 52 carried by lever 50 and a flange 53 carried by sleeve 51 serves the same purpose as the engagement between collar 32 and dogs 31.

A part spherical roller 55 is carried at the free end of lever 50 and is mounted to move, as a fixed or rotatable pin, within a cam slot 56 formed in a rotary arm 57. FIG. 2 shows the essential shape of slot 56 and arm 57 best, and shows that arm 57 is mounted to rotate about a vertical pivot 58 and is attached to an operating member 59. By holding and turning the member 59, an operator may turn arm 57 about its pivot 58. The mounting of sleeve 52 and lever 50 constrains roller 55 to move in a single plane between extreme positions 55a and 55b (FIG. 2). A rotation of arm 57 through angle 60 (FIG. 2) will thus cause roller 55 to move from one extreme of its movement to the other, extreme 55a occurring when it lies at one end (55c) of slot 56 and the other extreme (55b) occurring when it lies at the other end 55d of the slot.

FIG. 3 also indicates, in outline only, a prime mover 65 by which input shaft 43 is driven, the final output member 66 of the transmission, and a gearing combination 67. This combination, located physically between output disc 45 and the final output 66, typically comprises two interconnected epicyclic gear sets, with one component of the second epicyclic set constituting the output of item 67 and being directly connected to final output 66, while output disc 45 and input shaft 43 constitute a joint input (by way of connections shown schematically at 63 and 64) to combination 67, each being connected to a different element of the first epicyclic set. The use of a gearing combination such as combination 67 in a transmission with a variator of toroidal race type is known from GB-2023753-B and GB-2100372-B By appropriate choice of epicyclic components and ratios, a combination 67 as shown in FIG. 3 can operate so that as roller pin 55 moves from one extreme 55a of its movement to the other extreme 55b, rollers 48 move from one extreme of their pivotal movement to the other. In FIG. 3 those two extremes are shown in broken lines at 48a, and in full lines at 48. For a given and constant speed of rotation of input shaft 43, when the rollers are in the extreme position shown in full lines at 48, input disc 40 will be rotating at its lowest speed relative to output disc 45 and the typical effect of gearing combination 67 will be that final output 66 is rotating at the maximum reverse-direction speed of which the transmission is capable. When rollers 48 reach the opposite extreme position 48a, in which input disc 40 is rotating at its highest speed relative to output disc 45, final output 66 will be moving at the highest forward speed of which the transmission is capable. As rollers 48 are moved continuously from the first extreme to the second by the continual movement of roller 55 from 55a to 55b, the speed of rotation of final output 66 changes progressively from maximum reverse to maximum forward, passing on the way a state (corresponding to an intermediate position of rollers 48 shown diagrammatically at 48b) in which although both of discs 40 and 45 are in rotation as are all the components of combination 67 except the output component, that output component is stationary and with it the final output member 66. This condition is called "geared idle".

Advantages of the cam-and-follower control of lever 50, as just described with reference to the Figures, include the following advantages. First is the positive control exercised by the cam upon the follower: movement of the cam causes the follower to follow readily, but response by the cam to a movement of the follower depends upon the inclination of the slot 56. If the angle of the slot 56 is less than the angle of friction between slot and roller, the roller is held irreversibly.

However if the slot angle is slightly greater than the angle of friction at the geared idle position, a small and possibly desirable self-aligning action of the roller 55 can be arranged to take place so that the lever 50 tends to find the zero torque reaction position—that is to say, the appropriate position it should occupy at geared idle—without the need for sensitive mechanical settings. The control of the cam upon the follower must be firm enough to prevent stray motions of the control which could result in forward or reverse rotations of final output 66 and hence creeping forward or reverse movements of any vehicle in which the transmission is in use.

Secondly, the ends of the slot 56 set positive limits for the movement of roller 55; within the slot, it cannot go beyond position 55c (corresponding to extreme of movement 55a) or beyond position 55d (corresponding to extreme 55b). Thirdly, by using a serrated or similar joint to attach operating member 59 to arm 57, the relative angular setting of these two parts can easily be changed relative to the transmission as a whole to suit some particular installation without changing the basic internal structural characteristics of the ratio-varying mechanism. Fourthly, the geometry of arm 57 and in particular the shape of slot 56 are capable of wide variation and will typically be such that the relationship between angular movement of the arm and the resulting movement of the pin-roller 55 is non-linear, the object of the chosen shape and geometry being to give a desired rate of take-up between reverse and forward speed so that harsh control movements of lever 59 are nevertheless smoothed out into progressive acceleration of the final output member 66, either forwards or backwards.

Figure 4:
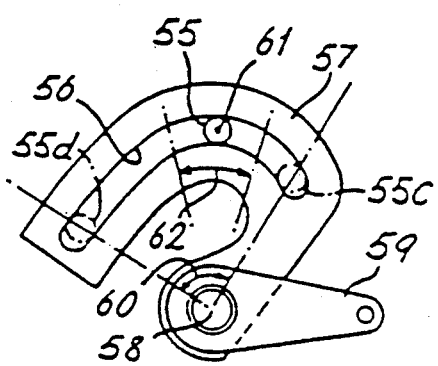
FIG. 4 is similar to FIG. 2, but shows a modified cam.

FIG. 4 shows an arm 57 of modified shape. The angular extent 60 of the full movement of the arm, carrying roller 55 between one end 55c of the slot and the other end 55d, is as before. However, for a limited angle 62 including that point 61 in the slot where the axis of roller 55 will nominally lie at geared idle, the radius of the slot about the axis of pivot 58 is constant. This creates a means for inhibiting departure of said final output member from said zero torque condition in the form of a control "dwell" around the geared idle state. That is to say, a substantial angular movement of member 59 will cause no movement at all of roller 55, so diminishing the chance that unintended movements of member 59 by an operator when the final output 66 and the vehicle are both at rest will cause the vehicle to start moving again, either forwards or backwards.

Additionally or alternatively and as shown in FIG. 2, means such as a pair of opposed springs 70 coupled to the lever 59 may be disposed to provide a centering bias towards the position associated with the geared idle state.

The angle 68 (FIG. 2) represents the "cam angle" of the instantaneous engagement between the roller 55 and the slot 56, being the angle between the slot axis (where it intersects the axis of the roller) and a line at right angles to the movement of the roller. This angle, at the geared idle position of roller 55, can be arranged to give the self-alignment action already described. Any small movement that the member 59 might make in response to such self-aligning action of the roller 55 at geared idle can be avoided if desired by well known means, such as incorporating some play, lost motion or "dwell" into the control mechanism.

I claim:

1. A continuously-variable-ratio transmission comprising
    a ratio-varying unit including
        an input disc and an output disc defining a toroidal race,
        rollers to transmit drive between said discs, and
        a control member disposed within said unit operable to vary attitudes of said rollers in unison so as to vary the transmitted ratio said control member having a follower connected thereto;
    said transmission having a geared idle state; and
    an operating member disposed externally of said unit, said operating member having an angularly movable cam for positively positioning said follower, the movement of said follower being non-linearly related to the movement of said cam and being arranged so that, for a constant speed of said input disc, movement of said follower from one extreme of its movement to the other causes a change of motion of a final output member of the transmission from maximum speed of rotation on one sense through said geared idle state to maximum speed of rotation in the opposite sense.

2. A transmission according to claim 1 in which the engagement of the cam and follower when the transmission is in the geared idle state and no input force is being exerted upon the operating member of the mechanism, is such that any tendency of the final output member to depart from a zero torque condition gives rise to a reaction between the follower and the cam which tends to move the follower so as to restore that zero torque condition.

3. A transmission according to claim 2 in which part of said cam is of constant radius relative to an axis of rotation of said cam, and said follower is in register with said constant radius part of said cam in said geared idle state.

4. A transmission according to claim 1 in which said operating member is biased to the position corresponding to the geared idle state of the transmission.

5. A continuously-variable-ratio transmission comprising
    a ratio-varying unit including
        an input disc and an output disc defining a toroidal race,
        rollers to transmit drive between said discs, and
        a control member disposed within said unit operable to vary attitudes of said rollers in unison so as to vary the transmitted ratio said control member having a follower connected thereto; and
    an operating member disposed externally of said unit, said operating member having a movable cam for positively positioning said follower, said cam comprising means defining an arcuate slot and said follower comprising a pin or roller moveable in said slot.

6. A continuously-variable transmission comprising
    a rolling traction variator unit including
        an input member,
        an output member, and
        a control member;
    a final output member;
    gearing means for coupling said output member of said variator unit to said final output member;
    an operating member disposed externally of said variator unit and having a cam member; and
    a cam follower connected to said control member of said variator unit and coupled to said cam member for positive positioning by said cam member;
    said variator unit being controllable by said operating member to vary the transmission ratio between said input member and said final output member from a forward ratio to a reverse ratio through a geared idle state wherein said input and output members of said variator unit are in rotation and said final output member is stationary and in a zero torque condition; and
    means for inhibiting departure of said final output member from said zero torque condition when said transmission is in said geared idle state.

7. A transmission according to claim 6 wherein said means for inhibiting comprises a portion of said cam, said portion providing a control dwell at a position of said cam corresponding to said geared idle state.

8. A transmission according to claim 6 wherein said means for inhibiting comprises means for biasing said operating member towards a position corresponding to said geared idle state.

* * * * *